United States Patent [19]

Mollenkopf

[11] 4,375,010
[45] Feb. 22, 1983

[54] PANEL CONSTRUCTION INCLUDING ELECTRICAL CONNECTORS

[75] Inventor: Lloyd C. Mollenkopf, Akeley, Minn.

[73] Assignee: Rosemount Office Systems, Inc., Lakeville, Minn.

[21] Appl. No.: 215,691

[22] Filed: Dec. 12, 1980

[51] Int. Cl.³ .............................................. H02G 3/00
[52] U.S. Cl. ...................................... 174/48; 160/127
[58] Field of Search .................... 174/48, 49; 160/127, 160/135, 229 R, 351; 52/220, 221, 173, 239; 339/22 R, 23

[56] References Cited

U.S. PATENT DOCUMENTS

| | | | |
|---|---|---|---|
| 3,735,794 | 5/1973 | Lebowitz | 160/351 X |
| 3,766,692 | 10/1973 | Stark et al. | 52/239 X |
| 4,060,294 | 11/1977 | Haworth et al. | 174/48 X |
| 4,104,838 | 8/1978 | Hage et al. | 160/135 X |
| 4,232,183 | 11/1980 | Person | 174/48 |

Primary Examiner—A. T. Grimley
Assistant Examiner—D. A. Tone
Attorney, Agent, or Firm—Kinney, Lange, Braddock, Westman and Fairbairn

[57] ABSTRACT

A modular panel wall system having connectable pre-wired electrical harnesses in panel top raceways and transition connectors coupling the electrical lines across connecting posts on which the panels are mounted. The transition connectors conceal the wiring in panel junctions. The panels are removably joined at a post. In order to disconnect the panels from the post, the transition couplings extending between the panels must be removed for safety. Lower raceways of the panels have openings into which receptacles for electrical power can easily be inserted, and wires are transferred within a vertical member from the top raceway to the bottom. The receptacles are isolated from the main lower raceways to permit the lower raceways to be used for communication wiring.

14 Claims, 13 Drawing Figures

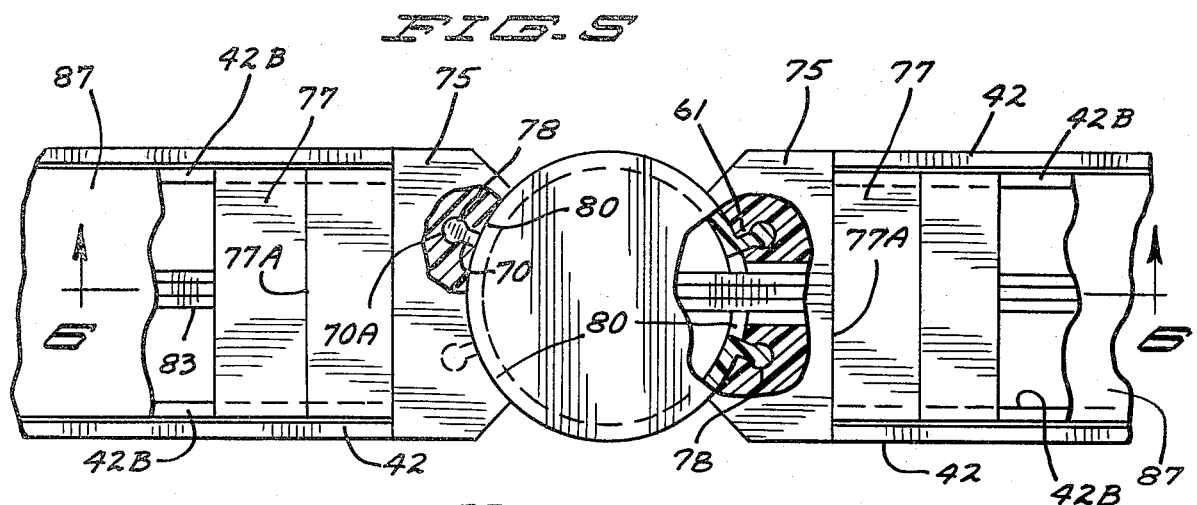
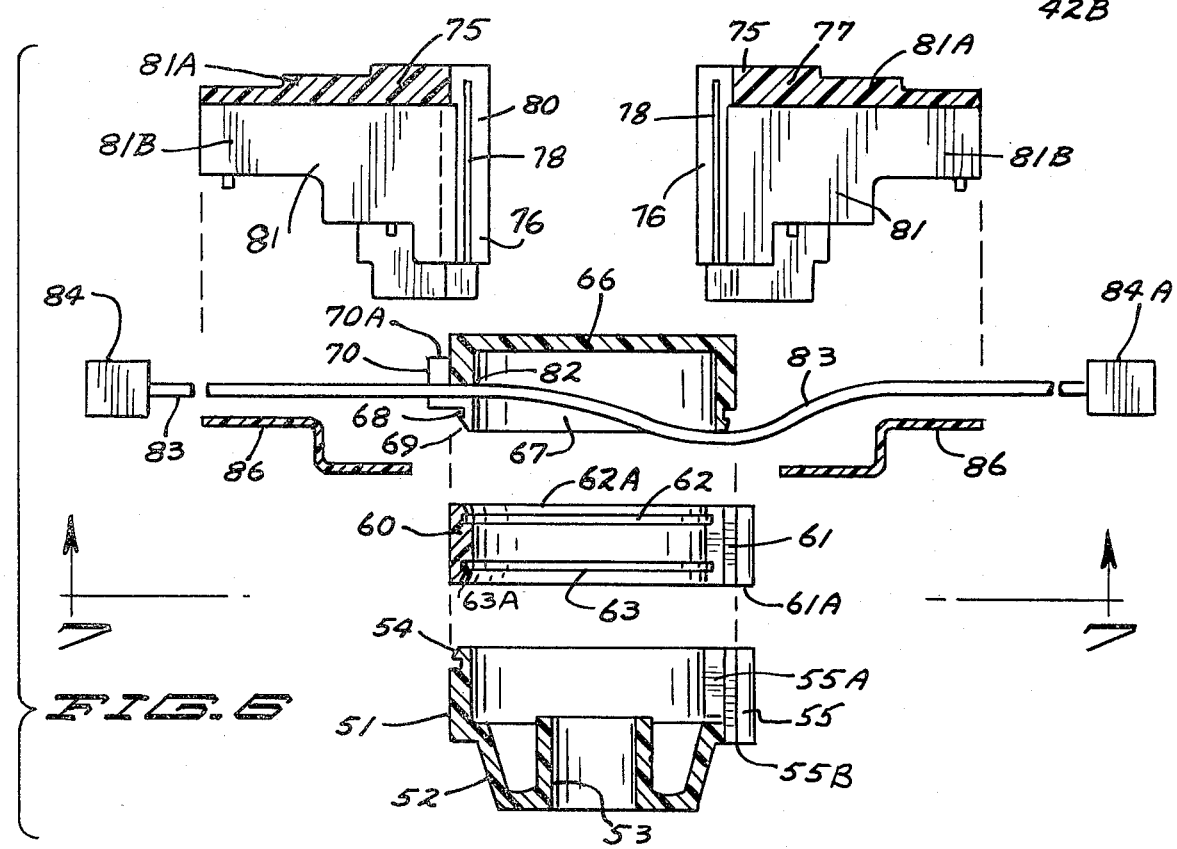
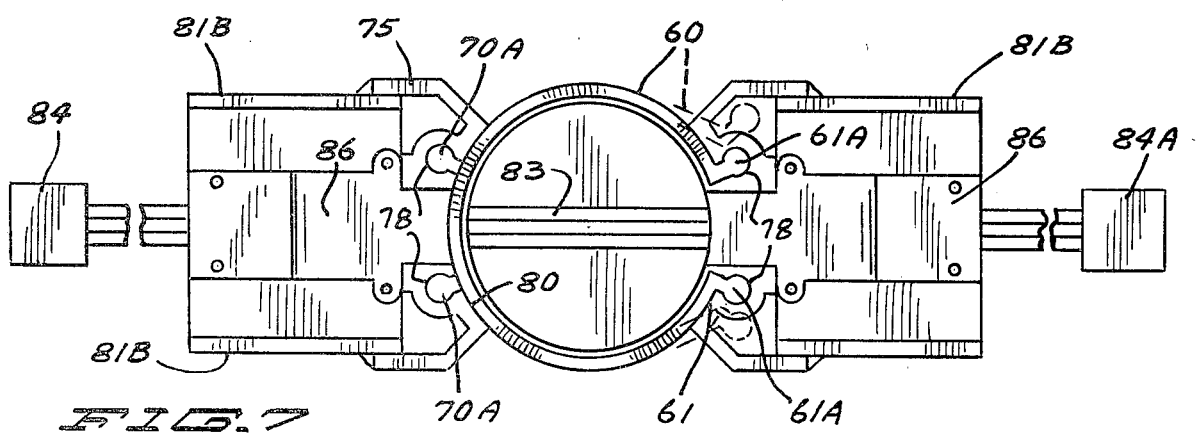

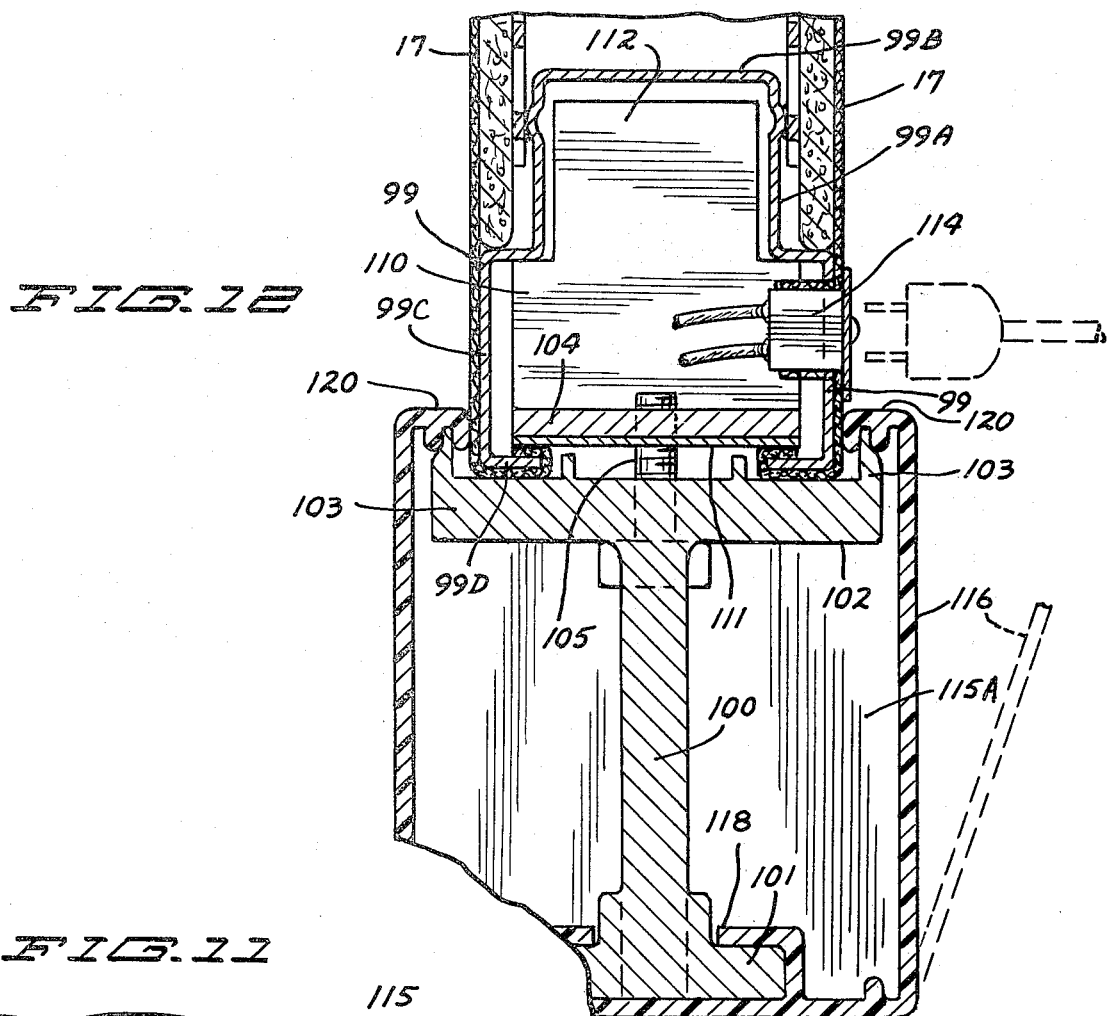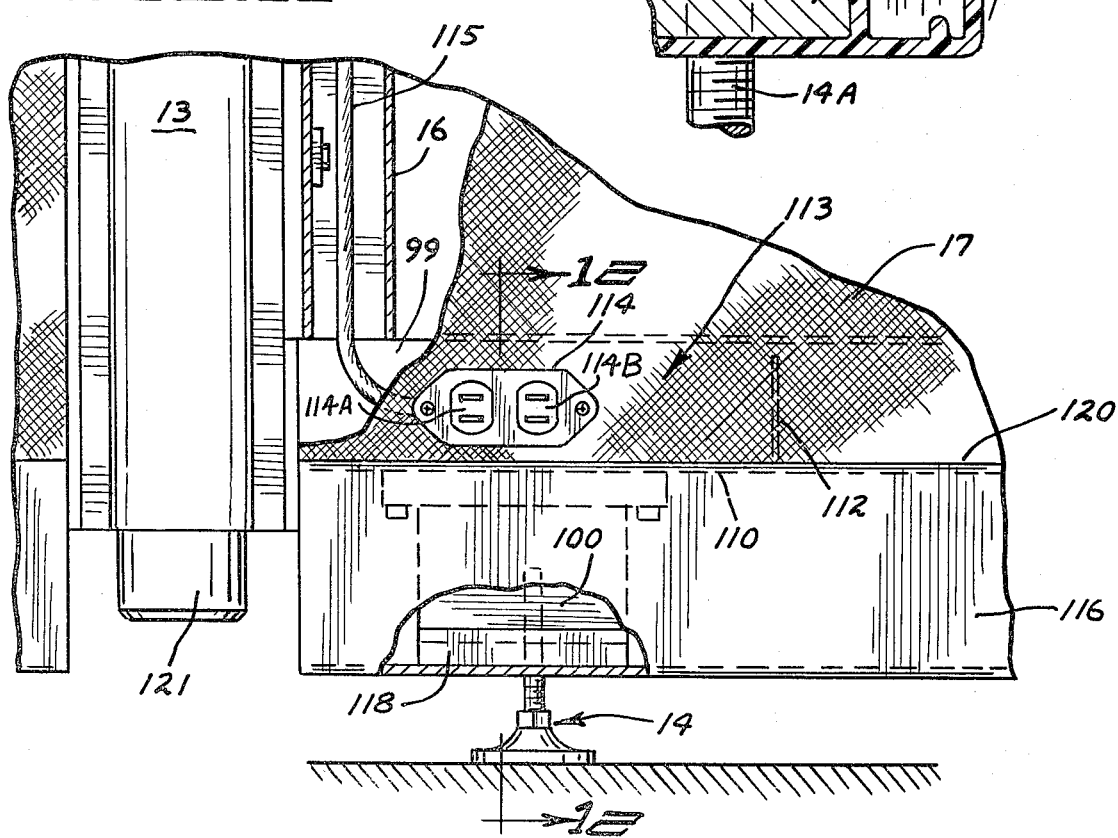

PANEL CONSTRUCTION INCLUDING ELECTRICAL CONNECTORS

BACKGROUND OF THE INVENTION

1. Field of the Invention

The present invention relates to modular panels or partitions for interior use, which may be prewired.

2. Prior Art

The prewiring of modular wall panels has been taught broadly in the prior art. For example, U.S. Pat. No. 4,060,294 shows a prewired panel system that has the wiring joined between the panels adjacent the bottom portions thereof, with connectors which have sockets or female receptacles on the panels, and male receptacles at the junction member between panels. The wiring is adjacent the bottom of the panel where it is susceptible to damage, and complex junction devices are necessary.

Prior to that time, however, connector devices for electrical raceways on walls had also been advanced.

Hinged raceway connections in electrical wiring systems are shown in several patents issued to J. F. O'Brien. These include U.S. Pat. Nos. 2,305,100 and 2,305,101. A patent issued to O'Brien et al. is U.S. Pat. No. 2,447,026. Couplings between raceways on wall partitions are shown and include male and female members that mate together for electrical connection.

The concept of having double male connectors between female receptacles at the ends of adjoining raceways, and permitting such connectors to go around corners is shown in U.S. Pat. No. 2,441,461.

Further, U.S. Pat. No. 2,947,041 illustrates a movable partition with electrical connectors bridged between the movable partitions by interlocking male and female connectors.

Modular connectors which are used for electrifying wall panels, or for carrying communication lines to such wall panels are illustrated in U.S. Pat. No. 3,719,768.

Flexible connectors between a joist system for carrying power between sections are shown in U.S. Pat. No. 3,612,167.

None of these patents, however, provide for a safe, easily manufactured and used system for carrying electrical power and movable partitions between adjacent partitions which hinge together.

SUMMARY OF THE INVENTION

The present invention relates to a modular panel or partition assembly utilizing electrical raceways that can be prewired, and which utilize attractive transition members extending between the raceway on one panel to the raceway on the other panel and shielding the wiring used to carry power between adjacent panels.

In particular, the transition members mount on posts which hold the two (or more) panels together, and are molded so that the "bridging" portion carrying power from one panel to the other is completely enclosed, but yet easily assembled for use while maintaining the prices at a low level.

The power connections can be run from the upper raceways, which normally carry the power lines in the form shown, down to lower raceways in which receptacles or outlets can be provided. The lower raceways can also house communication lines and have isolating shields for the receptacles to insure safety.

BRIEF DESCRIPTION OF THE DRAWINGS

FIG. 5 is a top plan view of a bridging or transition connector used with the panels shown fragmentarily in FIG. 1;

FIG. 6 is a sectional exploded view taken as on line 6—6 in FIG. 5, with the parts separated or exploded in vertical direction;

FIG. 7 is a sectional view taken as on line 7—7 in FIG. 6;

FIG. 11 is a fragmentary sectional view of a lower portion of a panel showing details of a support member adjacent to the coupling post, and FIG. 12 is a sectional view taken as on line 12—12 in FIG. 11.

DESCRIPTION OF THE PREFERRED EMBODIMENT

Figure 1:
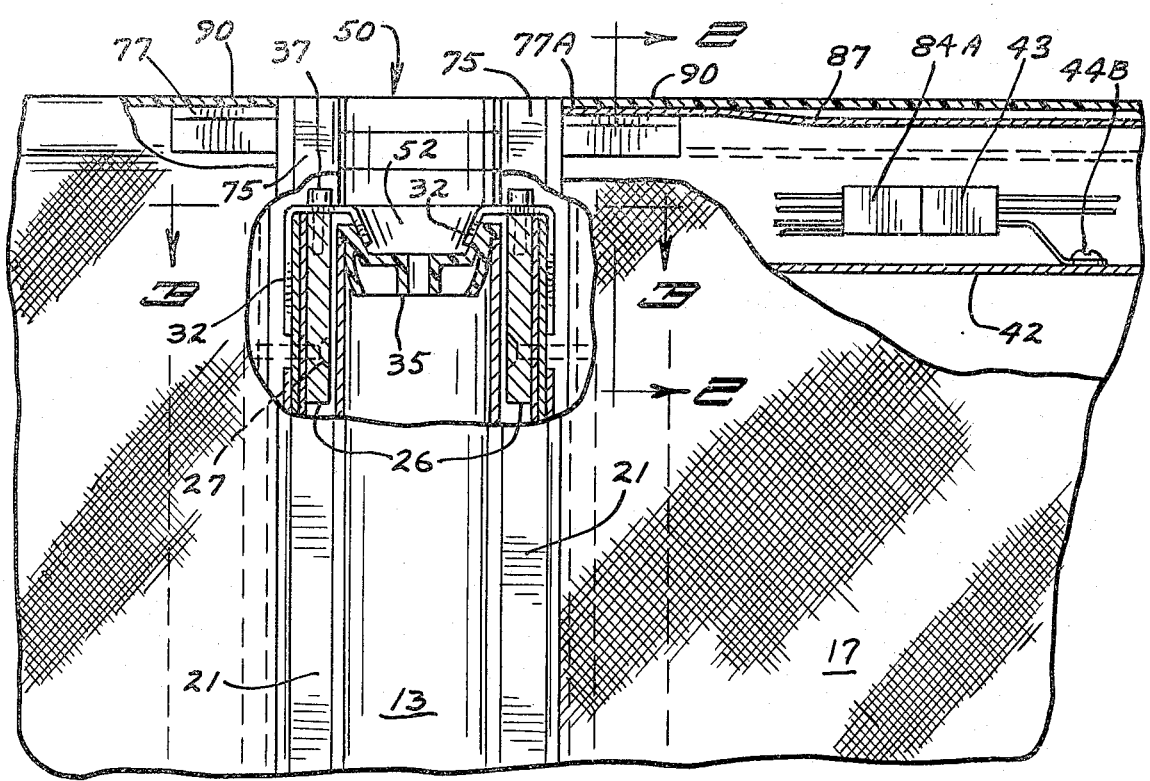
FIG. 1 is a fragmentary vertical side view of a panel junction assembly having electric raceways at the upper end thereof and junction members made according to the present invention installed thereon.

The device of the present invention relates to providing power on movable wall panels indicated generally at 11 and 12, and connecting the power across the panel support post. The panels 11 and 12 are supported on suitable brackets and support feet, indicated generally at 14 (FIG. 11). The panels can be any desired construction, but where the panels are directly supported on feet the panels have a perimeter frame including some type of end, top and bottom frame members. In the form shown the panels are connected together by attaching the panels 11 and 12 to a central tubular support post 13 which is circular in cross section and is relatively thin walled as shown.

The panels 10 and 11 each are provided with vertical end frame assemblies 15 which include vertical channel shaped frame members 16 that form a main vertical support for the panels, and these vertical channel shaped members 16 suitably support side walls on the opposite sides of the panels that can be made in any desired way. An outer layer of fabric 17 covers the side walls. The vertical frame members 16 are part of the perimeter frame of the panels. The vertical members 16 are suitably fixed to metal, open-top channels forming raceways 42, and are also fastened to lower channels 99 (FIGS. 11 and 12). The lower channels 99 form the lower frame members of the perimeter frames.

A vertical strip 20 is placed on the interior of the frame members 16, as shown, and serves to provide for attaching an accessory support rail 30 and a molding extrusion 21 to the channel 16.

As shown, the molding strip 21 has a part cylindrical surface that is adapted to nest against the outer surface of the tube 13. The center portion of the molding 21 is formed into a channel shaped section shown at 22 in FIG. 3. This channel shaped section 22 has an inner wall 23 which clamps other vertical members relative to the vertical frame member 16. As shown a fabric anchor member 24 is fitted to the frame member 16. The accessory anchor strip 30 is placed between the wall 23 of the outer molding extrusion and member 24. The wall 23 is then clamped against strip 30 and member 24. The strip 20 carries nuts into which cap screws 25 are threaded. The heads of cap screws 25 bear against wall 23 and hold the individual vertically extending members (16, 21, 30, and 24) clamped together.

Additionally, near the top of each of the vertical frames which fit against the tube, the channel section 22 has a block 26 inserted therein, through which a longer screw 27 extends and is threaded into a nut on strip 20 to hold the block 26 in position and also securely clamp the member 21, the wall 23, the accessory strip 30 and the fabric anchor vertical member 24 to the vertical frame member 16.

This construction is identical for both the ends of the panels, so that the end of panel 11 which abuts the post 13, and also the end of panel 12 which abuts the post will fit against the post in the same manner.

Figure 3:
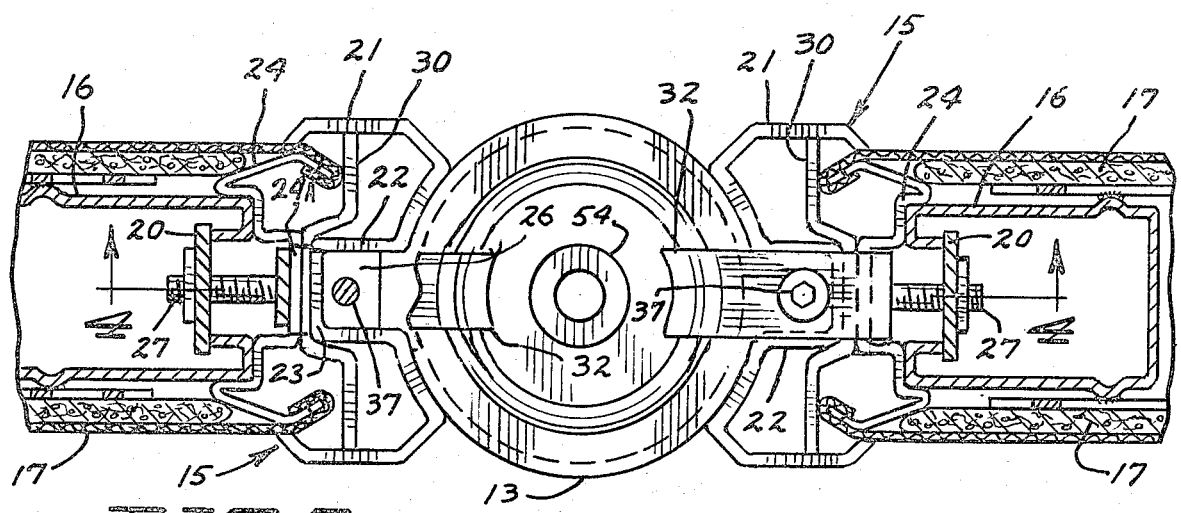
FIG. 3 is a sectional view taken as on line 3—3 in FIG. 1.
Figure 4:
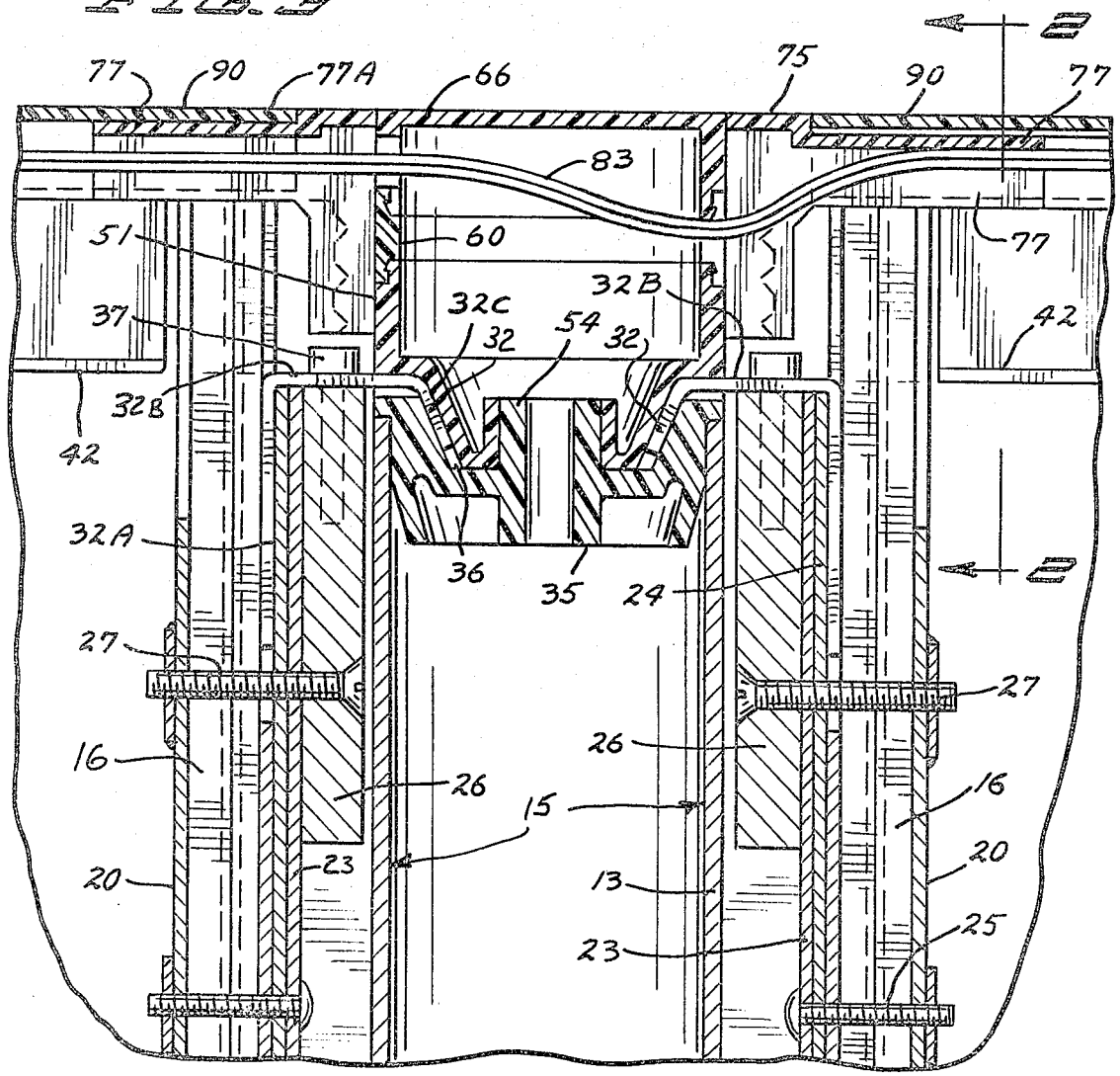
FIG. 4 is a sectional view taken as on line 4—4 in FIG. 3.

One of the advantages of having a round post, as can be seen in FIG. 3, is that the panels can be positioned on the post at an angle relative to each other. As shown the panels are in a single plane. In order to accommodate this with the present invention, it should be noted that blocks 26 are also provided adjacent the lower ends of the vertical frame members 16 of both panels 12 and 13. To secure the panels to the posts at any desired angular position about the post, each of the panels has a pair of retainer clips comprising an upper retainer clip 32 and a lower retainer clip 33 that have vertical legs 32A and 33A, respectively that fit between the legs of a channel portion 24A formed in fabric anchor 24 and the strip 20, as shown in FIG. 4. The fabric anchors are slotted at the top and bottom to provide clearance for the clips. Clips 32 and 33 pass over the ends of the respective members 21 and 30 as well as over the end of the slots in the member 24. Horizontal clip legs 32B and 33B pass over the top of the respective block 26 and each of the clips has a depending tang end 32C and 33C which pass over the ends of the tube 13, respectively, and nest into a recess formed in a cap member 35 which is positioned with a friction fit in the ends of the tube 13. The recess as shown is indicated at 36 and is part conical, tapering inwardly toward the axis of the tube. The support clips 32 and 33 are held in place with suitable cap screws 37 which thread into the respective blocks 26 at the top and bottom of the panel assemblies, and these support clips are made so that as they are threaded down toward their respective blocks they will tighten against the caps 35 and in particular the surfaces defining the recesses 36 in such caps, until they are seated. The clips 32 and 33 clamp the caps against the tube, and in turn clamp the moldings 21 tightly against the posts. In this way, the individual panels are held securely on the posts, but the caps 35 will slip to rotate so the panels can be moved relative to each other about the posts. If needed the cap screws can be loosened.

There are feet 14 at the bottom of panels for supporting the panels 11 and 12. The posts thus are not used for support as shown, but merely hold the ends of the panels assembled.

Figure 2:
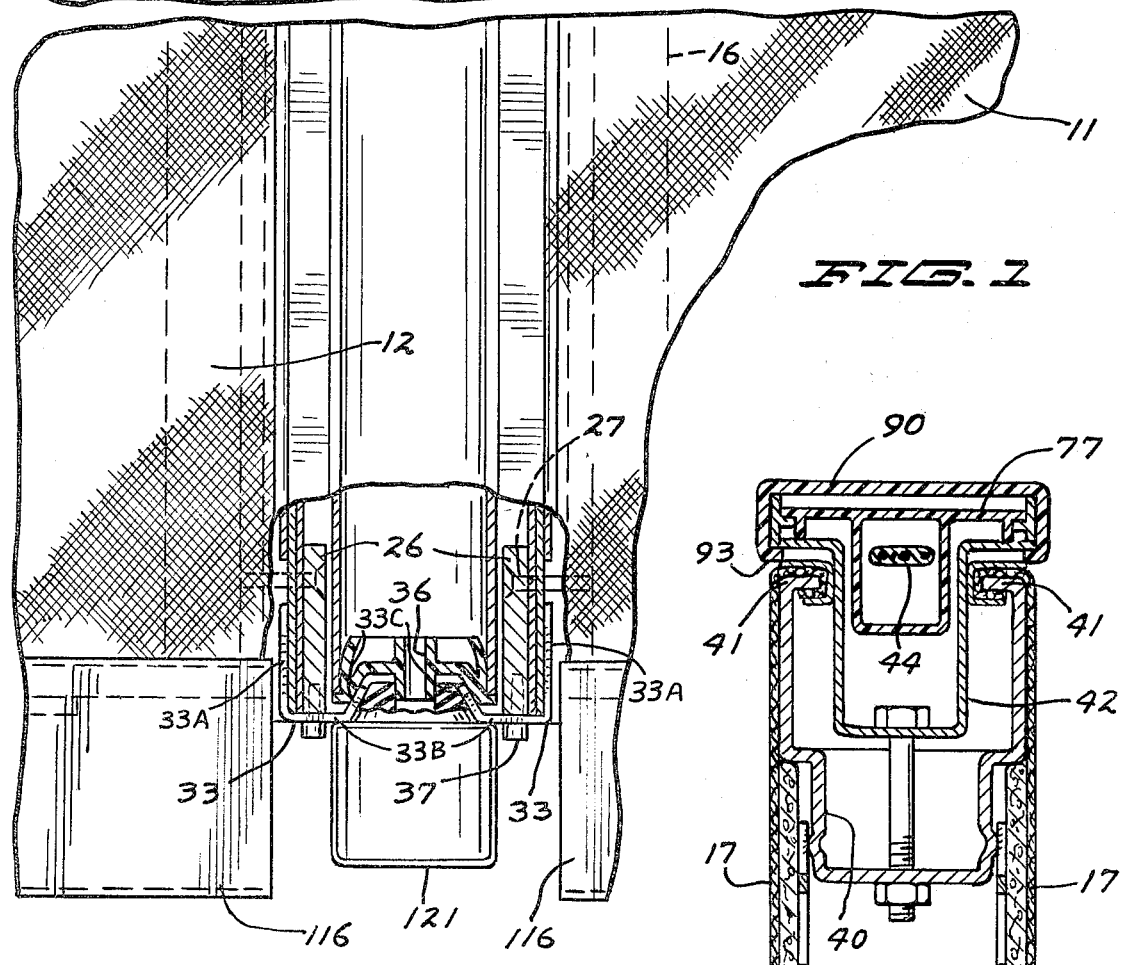
FIG. 2 is a fragmentary sectional view taken as on line 2—2 in FIG. 1.

The cross section of upper portions of the panels 11 and 12 is typically shown in FIG. 2 (and also in FIGS. 8, 9 and 10) and includes a horizontal frame member 40 which is channel shaped and has inwardly directed legs 41 that can be used for fastening the outer fabric cover 17 of the panels. An electric raceway channel member indicated at 42 is mounted along the top edge of each of the panels 11 and 12. This is the raceway in which electric wires may be carried, and which in turn house a first connector 43 connected to the wires 44 which are carried by this raceway 42 laterally across the top of each of the panels. Thus by having connectors 43 at the opposite ends of the wires 44 on each end of the panels, and using suitable bridging connections between panels, electricity can be run from a desired power source to any one of the panels in a series. It should be noted that the connectors 43 at the ends of the wiring harness in the raceway are not fixed to the raceway, but instead the ground wires, about 6-8 inches long, extend from the connectors, and the free ends are fastened to the raceways with screws to keep the harness from sliding along the raceway.

The wiring harness transition or bridging adapter for electrical wiring is shown generally at 50, and not only provides a smooth, attractive finished trim to the upper surface of the center post 13, but also permits easy insertion and removal of the necessary connectors for bridging the power from the wires 44 and connector 43 of one panel to the wires of the adjacent panel.

At the top of the center posts transition caps 50 are mounted. The caps 50 have generally cylindrical members in the center portion that are used for the top trim of the post and form a hinge member that permits the outer portions of the assembly to pivot relative to one another about the axis of the post.

The cylindrical members are stacked, interlocked molded plastic members and include a panel end cap 51 which has a conical lower portion 52 that fits into the recess 36 and nests in this recess over the clip ends 32C. The lower cap portion 52 has a central cylindrical sleeve 53 which has an opening that fits over a neck 54 of the post top insert 35 to hold the panel end cap in position overlying the post and the post insert 35 with a light friction fit. (See FIGS. 4–7)

The upper portion of the end cap 51 has an annular recess adjacent the top thereof which forms an annular lip or shoulder 54 around the perimeter of the cylindrical upper wall of the end cap. The lip 54 is inset from the outer surface of the end cap. The cylindrical wall portion of cap 51 has a pair of ears 55 thereon that are elongated in axial direction and extend radially out a short distance from the end cap. The ears have end ribs 55B that are part cylindrical members extending in vertical direction. These ears 55 form mounting or retaining members for additional portions of the transition caps as will be explained. A slot 55A is formed between the ears 55.

To hold the parts of the transition cap 50 in an assembly, a center split retaining band indicated generally at 60 is utilized. This band is molded to be part cylindrical, but is not continuous or enclosed. In other words as shown in FIGS. 5 and 6, the band 60 is split and terminates short of completing a full annular band. A pair of ears 61,61 which also have knobs or ribs 61A at the outer ends are formed at the ends of the band 60. This band then is flexible and can be spread outwardly to a dotted position as shown in FIG. 7. The band has a pair of grooves adjacent the upper and lower edges thereof shown at 62 and 63, respectively. The grooves 62 and 63 form a type of retainer lip 63A and 62A adjacent the edges. The lip 63A fits into or interlocks with the groove below lip 54 of the lower end cap 51, and can be snapped into place on the lower portion by expanding the band 60 slightly as shown in dotted lines in FIG. 7.

The upper member of the assembly comprises a closed top transition cap 66 which has an annular wall 67, and a groove 68 defining a lip 69 around the perimeter thereof. The lip 62A of the band 60 fits into the groove 68, and the lip 69 fits into the groove 62 of this band so that when stacked together as shown in FIG. 4, the cap parts are interlocked and are yet free to rotate relative to one another.

The cap 66 has a pair of ears 70 which extend radially out therefrom at desired angles, and have outer end knobs or ribs 70A. These ears, as shown in the exploded view of FIG. 6 terminate below the plane of the top of cap member 66.

The transition caps further include panel insert end members that also act as retainers for holding the center cylindrical parts together. The panel insert members are shown at 75. They are identically constructed and one such panel insert is used for each panel connected to the post. As shown two panel inserts are provided. The inserts each include vertical column portions 76, and end portions 77. The vertical column portions 76 each have a pair of uprightly extending channel receptacles 78,78 that are of size and positioned to receive the ears of the cylindrical member of the transition assemblies. The ears 55 of lower portion 51 and the ears 61 of center band 60 are held in the receptacles 78 of one of the panel inserts. The ears 70 of the top cap 66 are inserted into the channel receptacles 78 of the other panel insert members. The receptacles 78 are molded in place, and slots are provided so that the ears can slide into position when the parts are put together. The depth of receptacles 78 can be varied to aid in properly locating the parts held in the receptacles. Surfaces 80 mate around the outside surfaces of the junction members 51, 60 and 66.

A passageway 81 is defined in the center portions of the insert member 75 by walls 81B. An upper wall 81A covers the passageway 81.

The upper cap 66 has a passageway 82 formed between ears 70 so that wiring from a transition wiring harness indicated generally at 83 can extend from one of the end members 75, across the cap assembly 66, through the cap between the ears 61 of the ring 60 and then out through the passageway 81 of the other end panel insert member. The wiring harness 83 includes the wires as shown, and end connector members 84 and 84A at opposite ends thereof. The input end connector 84A is a male connector and the other connector (or connectors if three or four panels are joined together) are female connectors.

The passageways 81 are initially open at the bottom as shown, and there are removable retainer clips 86 that can be placed over the passageways 81 and fastened in place after the parts have been assembled as a unit and the wiring harness is in place. Sonic welding can be used for fastening the clips in place and for holding the assembled parts together.

For assembly, however, the clips 86 are separate from the panel end inserts 75 and as a first step of assembly, the ears of cap member 66 are slid up into the receptacles 78 of the left hand insert 75 shown in FIG. 6 so that the top wall of the cap 66 is adjacent the top of the panel insert members 75. The wiring harness can then be slipped up into the passageway 81 on the left hand panel insert member and passed through the opening 82 of the cap 66 so that it will extend to the right as shown in FIG. 6.

Next, in the assembly, the ring 60 is snapped up into the groove 68, but the ears 61 are not at this stage retained, so that the snapping operation can easily be accomplished. The space between the ears 61 provides a passageway for the wires of the wiring harness. Then, the lower member 51 is moved up into place so that the lip 54 and the lip 63A interlock so that the ring 60 and member 51 are rotatably mounted together. Also, the top cap 66 may be placed on the ring 60 in a stack.

The right side panel insert 75 is moved down and ears 61 are slipped into the receptacles 78 of the panel insert. The ears 55B also fit into the receptacles 78 of the right hand panel insert 75. The ears 61A are moved together and lip 69 will also be held in groove 62. The ears are thus retained in place. The transition wiring harness is enclosed in the transition members and passes from one side to the other.

Then, the left hand panel insert member 75 will be moved so that the receptacles 78 will receive the ears 70 and outer end portions 70 of the top cap 66. When this is done, the lips 62A and 63A will tighten down into the respective grooves of the cap 66 and member 51 to retain them securely in a vertical assembly, but yet permit relative rotation. The right hand panel insert member 75 therefore holds the ring 60 in a cylindrical configuration as shown in FIGS. 5 and 7, and by moving the panel insert members 75 relative to each other rotation can be obtained. The wiring harness of course is passing to the right through the passageway 81 of the right hand panel insert member 75 and is held in place by the upper edge of the cylindrical base member 51.

The inserts 86 can then be positioned into place either by having small interlocking snaps or detents, by friction fit or by plastic welding to insure that the wiring harness does not tend to fall out through the bottom of the passageways 81 near the outer ends of the panel inserts.

Each of the panel members 11 and 12 has the raceway 42 extending longitudinally thereacross. The panel insert member outer extending end portions 77 fit within the upper edge portions of the upper panel raceways as shown in FIGS. 2 and 8, and the electrical connector members 84 and 84A fit down into the main portion of the raceway to be connected to the connectors 43 in a suitable manner once the panels are assembled on a post and the transition assemblies 50 are positioned in place.

Figure 8:
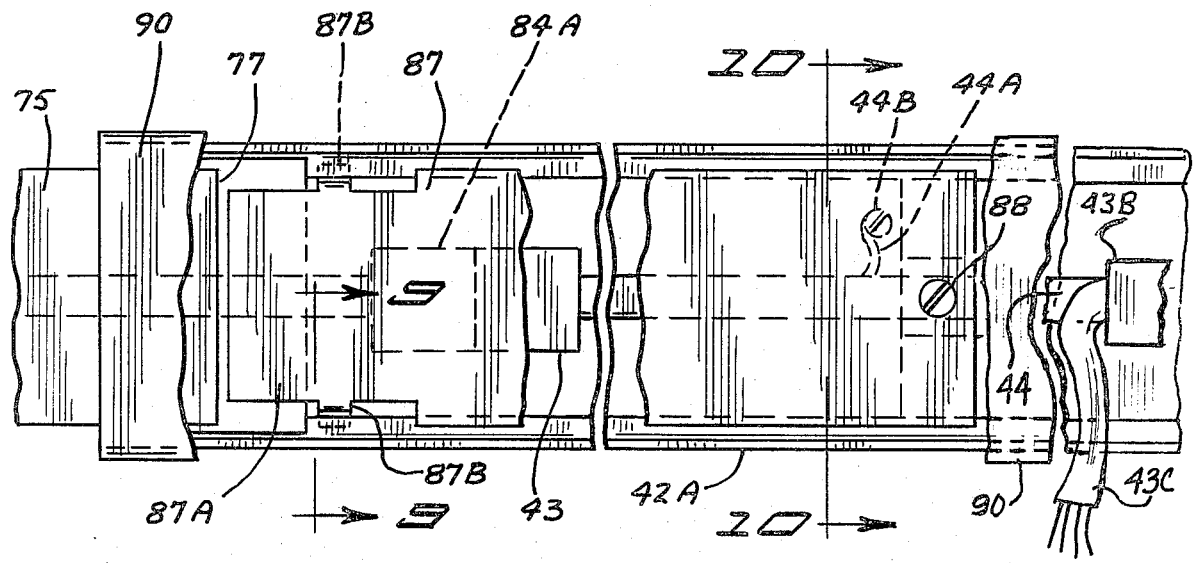
FIG. 8 is a top plan view of one end of the transition member shown in FIG. 5, and also showing a portion of the raceway on one of the panels which is being connected, with parts in section and parts broken away.

The portions 77 of the panel transition members fit within the top raceway 42 as can be seen in FIG. 8 perhaps best. The raceway is a channel shaped extrusion that is held in place against the main frame member 40 with fasteners as indicated at 85 in FIG. 10. The upper portions of the raceway 42 comprise a widened portion 42A which has upright legs with inwardly directed ribs 42B running longitudinally along the raceway. The end portions 77 fit within this wider part, as can be seen in section in FIG. 2, and substantially extend across the space between upright legs of the wide portion 42A.

The main portion of the raceway 42 has a plastic cover 86 snapped into place in the raceway with grooves provided along the longitudinal edge of the cover which receive and fit onto the ribs 42B of the upper end of the raceway. Cover 86 is extruded plastic which can be bent in the center to snap into place over the ribs 42B and thus the wires within the raceway are shielded by the plastic member 86. Adjacent the ends of the raceway where the connectors 84 and 84A and connectors 43 for the wiring 44 are joined together, the raceway is covered with a metal cover 87 that fits on top of the ribs 42B and which has an end tab portion 87A which overlaps a reduced size end of the end portion 77 of the transition assemblies. The metal cover 87 is secured in place to an end of the plastic cover 86 with a screw 88.

Figure 9:
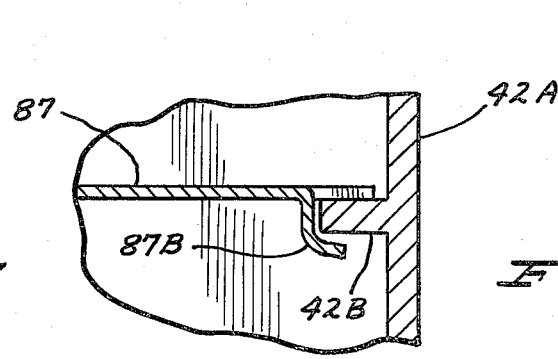
FIG. 9 is an enlarged sectional view taken as on line 9—9 in FIG. 8.

The end of the metal cover 87 adjacent the transition member end portion 77 is provided with depending ears 87B on both sides which are formed to go underneath the ribs 42B as can be seen in FIG. 9. The ears 87B retain the cover 87 and prevent it from being lifted up. Yet, once the screw 88 is removed the metal cover 87 can be slid longitudinally away from the respective transition members end portion 77 to permit the connectors 43 and 84, or 84A to be either disconnected or connected. The metal plate 87 can then be repositioned as shown in FIG. 8 to retain the end portion 77 within the raceway with the overlapping end portion 87A and the ears 87B, which in turn are retained by the ribs 42B.

Figure 10:
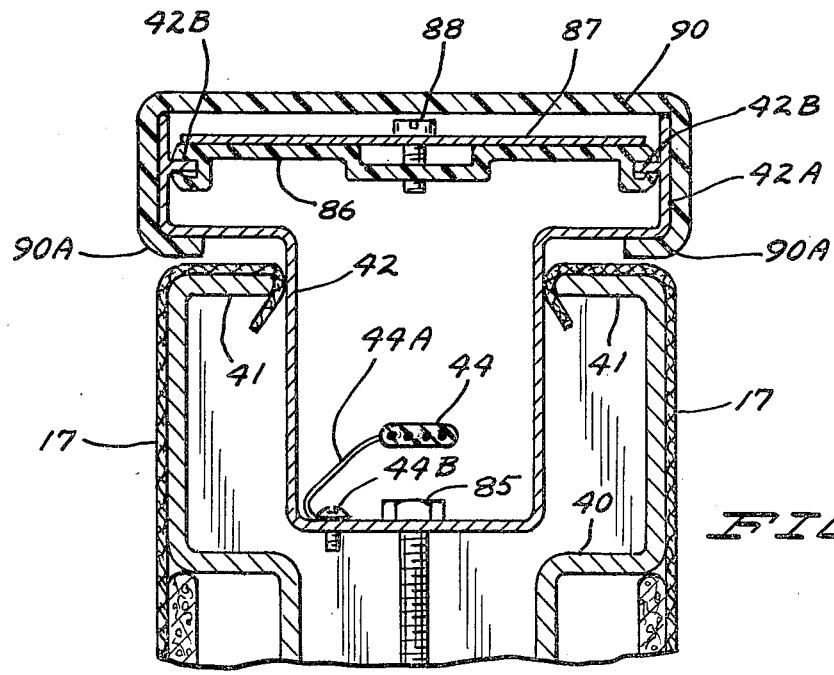
FIG. 10 is a sectional view taken as on line 10—10 in FIG. 8.

An entirely metal enclosure is formed where one of the connectors 43 and connector 84A are joined and ready access is provided for servicing. It should be noted that a plastic cap 90 is snapped over the upper portion 42A of the raceway as can be seen in FIG. 10. The cap 90 is flexible enough so that the underlying leg portions 90A on opposite sides can be spread out to clear the edges of the raceway, or snapped into position for a finished look.

The wires 44 which are in a harness include a ground wire 44A which extends only a short distance from the connector 43, and the ground wire 44A is fastened to the raceway with a suitable screw 44B so that the wiring harness is held in the raceway, but is not tightly secured. The wiring harness can be slid longitudinally a limited distance along the raceway, but will not slip out of the raceway because of the anchoring of the ground wire. Also, the frame is then grounded for safety.

Except as will be explained, the connectors 43 are male-female. In other words, one of the connectors 43 is a male connector and at the other end of the same wiring harness for that panel has a female connector. The connectors 84 and 84A are mating connectors, again one male and the other female. Then connectors 43 in the panel raceway are not attached directly to the raceway, and thus they can be manipulated for connection and disconnection with the connectors of the transition assembly.

With the cover 90 in place, the top raceways are completely enclosed, attractive, and easily utilized. It should be noted also that the upper cap molding 90 and the inwardly turned edges 90A extend to overlie the end portion 77 of the transition assembly and abut against a shoulder 77A formed on the end portion 77 (see FIG. 5).

When electrical power is to be provided to the lower portion of the panel for accessory power, it is branched off from the connectors 84 or 84A with separate wiring harnesses doubled into the plugs. The harnesses extend downwardly through vertical frame members 16. It can be seen that the upper raceway 42 can have a notch at its lower wall to permit the wires to pass into the vertically open channel of frame member 16.

Referring specifically to FIGS. 11 and 12, the lower end of the vertical frame member 16 is illustrated together with a lower horizontal frame member 99 that has a suitable notch to permit the channel from the frame member 16 to be opened to the lower horizontal frame member 99. As can be seen, the frame member 99 is a channel shaped member having an upper narrow portion 99A, with a closed upper wall 99B and a wider lower portion 99C comprised of two spaced legs that extend downwardly from the upper portion and which have inturned end flanges 99D. The edges of end flanges 99D have suitable serrations or teeth thereon for anchoring the fabric cover 17 at the lower end of the panel.

The lower frame members 99 are supported on support feet 14. The feet 14 are mounted on adjustment screws 14A which provide for leveling. The screws 14A are threaded through provided threaded openings in support blocks 100. The support blocks 100 as shown have vertically extending webs positioned adjacent the opposite ends of the panels. The webs have lower lug portions 101 and upper retainer portions 102. The retainer portion 102 is a relatively heavy horizontal member that has upstanding guide legs 103 along opposite sides. The legs 103 are spaced apart to fit to the exterior of the lower portion 99C of the lower frame member. The horizontal member 102 is then clamped against the inturned edges 99D of the lower portion 99C of the frame member 99 by using a clamp plate 104 that is placed on the interior of the channel member 99 and has a threaded opening into which cap screws 105 are threaded. The cap screws extend through provided openings in the member 102, and by tightening the cap screws the plate 104 is clamped down against the inturned edges 99D and in turn clamps the portion 102 against these inturned edges. In this manner the support 100 is securely held with the frame member. Using a support adjacent each end of a movable panel is adequate.

It should also be noted that an electrical isolation guard 110 is formed with a horizontal portion 111 that is clamped between the plate 104 and the inturned edges 99D. As can be seen in FIG. 12, the isolation guard has an upturned end portion 112 that fits into the narrow portion 99A of the lower frame member 99 and effectively blocks airflow into the end part of the lower frame member 99. This defines a chamber generally indicated at 113, in the upper portion 99A of the lower frame member and by providing an opening in the wall of the frame member adjacent the narrow portion, an electrical outlet 114 can be fastened in place through the opening and connected to a wiring harness 115 passing downwardly through the channel 16.

The isolation members 110 form a chamber isolating the electrical wire 115 and the outlet 114 from a communications raceway indicated at 115A that is defined by a flexible plastic housing 116. The housing 116 is held in place by having the end member 101 of support 100 slid into a holding receptacle 118 formed in the bottom of the member 116. The upper edges of the side walls of the flexible housing 116 are inturned as shown at 120 and have grooves which fit over provided lips on the wall portions 103 of the support 100. The flexible housing 116 permits flexing sufficiently so that the inturned edges 120 can be lifted off the support and folded downwardly and out generally as shown in dotted lines in FIG. 12 so that the communication wire in raceway 115A can be serviced.

The housing 116 need only be supported at the places where the supports 100 are located, and it will be retained sufficiently so that the upper inturned edges 120 tightly engage the side fabric covering 17 along the bottom of the panels to provide a smooth, attractive appearance. The chamber 115A is available for all communications wiring such as telephone or telex, and it can be done safely because the isolation member 110 blocks off the electrical outlet 114.

As can be seen, the lower end of the center post 13 can have a suitable finish cap 121 installed thereon for decorative purposes. A removable shield extending from one of the raceways 16 to the other on adjacent panels also may be used. The shields would form continuations of the side walls of the lower raceways.

Because the electrical power does not run across the bottom raceway along its entire length, the installation of electrical outlets is simplified and isolated from the communication outlets also in the raceway 115A at the bottom of the panel. This use of an upper raceway for electrical wiring also makes the electrical connection more accessible than near the bottom of the panel. With the metal cover 87 being utilized where connections are made, easy access is provided for connection and disconnection of the electrical harness and for other service.

It should be noted also that the transition members can carry a wiring harness and can have two or more connectors. For example, if three panels are connected together, the wiring harness in the transition members would have three connectors, one of which would connect to a panel carrying the power from a power source and the other two would then carry the power onto the two other panels being fastened to the post 13. Three end inserts 77 are also used, one for the raceway on each panel joined. Four panels also may be joined together at a post 14 and a four branch wiring harness is used.

It therefore should be noted that if the panels are to be rotated or moved relative to the post 13 in any way, the covers 90 must be slid out of position, either by sliding them longitudinally along the raceways, or snapping them out of place. Plates 87 must be moved, and the transition assemblies also have to be removed to permit access to the cap screws 37. In order to do this, the power must be disconnected because the wiring harness 83 is selected to be of such length that by the time the transition assemblies 50 are pulled out including end portions 77, the connectors 84 or 84A must be removed from the connectors 43.

It should also be noted that the lower mounting member 51 of the transition assembly has a recess indicated at 55A between the ears 55, and this recess can be used for a wire opening where a three-way connector assembly is used. In a three-way connector assembly, an additional panel interlock member 75 would be utilized along with the end portions 77, and in such an instance, instead of the right hand panel insert member 75 being attached to the middle and bottom ring of the concentric members of the bridge assembly, each of the three panel inserts 77 would be connected to one of the rings by slipping the receptacle 78 over the respective ears, and in this way each of the three members could rotate relative to each other a limited distance, until they engage each other as they were rotated.

The vertical channel members 16 of each of the panels defines an open interior, into which the wiring harness 115 can pass down to the lower frame member. Normally the extending of the wires downwardly is done by merely passing the wires out through an opening in the lower part of the panel transition assembly, which lower part is shown at 51. An outlet 114 is provided in the lower raceway as explained, and wiring to the conventional outlets 114 is done in this manner. With the four wire assembly, two separate circuits can be connected to each individual outlet in an outlet opening 114A and 114B.

It is not until the bridging assembly is removed that the cap screws for the support clips can be accessed, so that the panels themselves cannot be disconnected one from the other until the bridging adapters are removed and the electricity or power is disconnected between the panels.

It is to be noted that the power flow of the present panels is directional because of the way the electrical connectors are arranged. That is, one end panel of a series of adjacent second panels is considered the "power-in" panel. The raceway for that one panel has a wiring harness with the same type of connectors at both ends of the raceway (female and female). The rest of the panels have raceways with wiring harness arranged with one male connector at one end and a female connector at the other.

For example, the connectors shown in FIG. 8 include a female connector 43 at the left side and a female connector 43B at the right side.

To electrify the panels the connector 43B has a power connect cord 43C wired in parallel with the wiring harness for that panel at the connector 43B. The wires from core 43C are molded in connector 43B along with the wires from the harness 44. The power cord extends down the channel 15 for the power-in panel and has bare wire ends that are hard wired to a power source by an electrician. Both female connectors 43 and 43B of the power-in panel can be connected to transition wiring harness to carry power to adjacent panels.

The wiring harnesses in the transition caps, as stated, are made with only one male connector on one branch (the input end) which is connected to the connector 43 (or 43B) at the output end of the harness of the first panel.

Figure 9A:
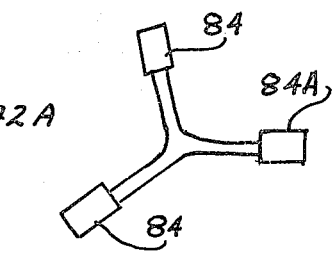
FIG. 9A is a schematic representation of a transition harness.

As shown schematically in FIG. 9A, if two panels are joined with the wiring harness, there is only one male connector 84A, but two parallel connected female connectors 84 on the other branches of the harness.

Thus the connectors on the output harness cannot be inadvertently coupled into two different circuits from different "power-in" panels. In other words, if an attempt is made to connect one of the connectors 84 to the "output" female connector of another panel they will not mate. The connectors 84 can only be connected to the male connector end of the harnesses in the second panel raceways. Because the first panel in circuit has two female connectors the output female connectors 84 cannot be connected to that panel harness at all.

Therefore, each circuit (or pair of circuits if two separate circuits are carried by the wiring) will be substantially incapable of accidentally being connected to a different circuit with the transition wiring harnesses. The power will be connected properly because of the orientation of the connectors and use of the same type of connectors at both ends of the raceway of the power-in panel.

It should also be noted that if four panels are connected at a post the upper cap 66 of the transition assembly will have two sets of ears 70 and openings for branches of the transition wiring harness.

What is claimed is:

1. In combination with a pair of movable wall partitions, an assembly for shielding electrical wiring harnesses for passing from one movable wall partition to the other at the top of the junction region of the movable wall partitions, the movable partitions including metal channels forming electrical raceways along the top longitudinal length thereof and support members for coupling adjacent movable wall panels together, said assembly being separate from the support members and comprising a first generally cylindrical member adapted to be positioned with its center substantially centered between the movable partitions, at least one additional generally cylindrical member rotatably mounted on the first mentioned cylindrical member for rotation relative thereto, a pair of panel insert members having portions adapted to fit within end portions of raceways of any movable partition with which the assembly is used, means to removably couple each of said panel insert members to one of the generally cylindrical members whereby each of the panel insert members can be rotated with one of the general cylindrical members relative to each other when installed on movable partitions, electrical wire means mounted in said raceways, said electrical wire means including connectors at opposite ends thereof adjacent the opposite sides of the respective partitions, and each connector having a ground wire connection with a ground wire attached thereto, and the ground wires from the opposite end connectors being connected to the associated metal channel raceway adjacent the respective ends of the associated raceway to ground the raceway and retain the connectors adjacent the respective ends of the raceway, and electrical harness means mounted within said panel insert members and traversing across and within the generally cylindrical members, said harness means including harness electrical connectors coupled to first mentioned connectors of the respective wire means in the adjoining movable wall partitions.

2. The apparatus of claim 1 and a metal cover overlying the portion of the raceway channel of each panel adjacent the connector members by the respective sides of the partition, means on said channel providing an inwardly extending flange along the sides of the channel, and means on said metal cover to receive said flange and being slidably mounted thereon so that said metal covers can be slid from a position overlying said connectors to a position clearing said connectors.

3. The apparatus of claim 2 and a plastic cover mounted on said flanges of the channel and extending along the major portion of said raceway, and means adjacent the ends of said plastic cover to releasably retain the metal covers in position adjacent the ends of the raceways.

4. The apparatus of claim 2 wherein said panel insert members have surfaces to engage a portion of the metal cover when the metal cover is positioned adjacent the respective ends of the raceway, said metal cover thereby preventing said panel insert members from being removed from the raceways when the metal covers are in position.

5. In combination with first and second movable partitions having longitudinal electrical wiring raceways, the improvement comprising a transition assembly shielding electrical wiring harnesses passing between the movable partitions, including means to support the partitions adjacent each other, the raceways of each partition having wiring harnesses therein with connectors adjacent the ends thereof, said transition assembly comprising a pair of panel insert end members fitting within end portions of the raceway of the respective movable partitions, a coupling assembly joining the panel insert members including means attached to each of the panel insert members forming a first generally cylindrical member having an annular edge lip, and a split band having a complimentary annular groove to receive the lip of the first cylindrical member to rotatably mount the first cylindrical member relative to the split band.

6. The combination of claim 5 including means joining the first and second movable partitions together and spaced between the partitions, said means joining including a post and clip members that are removably fastened between the post and the movable partitions, said transition assembly overlying the clip members at the upper side of the movable partitions to prevent releasing the clip members until the transition assembly and panel insert members have been removed from the adjacent movable partitions.

7. The combination of claim 5 and a lower frame member on at least one of said partitions, said lower frame member comprising a channel having side walls and being open toward the bottom of the partition, an opening of size to receive an electrical outlet defined in one side wall of the channel adjacent one end, electrical wiring means extending from the upper raceway of that partition to the lower frame member, and a bracket having a first leg positioned between the side walls of the channel below the opening in the side wall, said bracket having a second leg extending upwardly to the top of the channel adjacent the opening but spaced beyond the opening from the one end of the lower frame member.

8. The combination of claim 7 and a support foot member for one partition, means to clamp the support foot member to the lower frame member and simultaneously clamp the bracket in position in the channel.

9. The combination of claim 8 and post means between the movable partitions, said post means being adjacent the one end of the lower frame member to block off the one end of the channel.

10. An electrified arrangement for providing electrical power to a plurality of movable panels having longitudinally extending electrical wiring raceways thereon and having electrical wiring harnesses with electrical connectors at opposite ends, the electrical connectors including a first type which electrically connects only with a second different type of connector, the wiring harnesses of a first panel having connectors of only the first type adjacent the ends thereof, the wiring harnesses of each second panel having a connector of the first type at one end thereof and a connector of the second type connected to the opposite end thereof, and at least one wiring harness coupling assembly having an input branch and at least one output branch, the input branch having a connector of the second type at one end thereof and each output branch having a connector of the first type whereby the input branch may be connected only to the ends of wiring harnesses having the first type of connector, said first panel having a power cord fixedly connected to one of the first connectors, the power cord having one end adapted for connection to a power source.

11. An assembly for shielding electrical wiring harnesses for passing from one movable wall partition to another at the top of the junction region of the movable wall partitions, wherein the movable partitions include electrical raceways along one edge thereof, comprising a first generally cylindrical member adapted to be positioned with its center substantially centered between the movable partitions, a second generally cylindrical member, means to rotatably mount the first and second cylindrical members for rotation relative to each other including a third generally cylindrical member comprising a ring generally coaxial with and positioned between the first and second generally cylindrical members and which ring has an axially extending split which can be separated to expand the ring from a basic size generally equal to the size of the first and second generally cylindrical members, annular cooperating tongue and groove means between the adjacent edges of said first and third and third and second cylindrical members, respectively, a pair of panel insert members having portions adapted to fit within end portions of raceways of movable wall partitions with which the assembly is to be used, means to removably couple a first of said panel insert members to the first generally cylindrical member and to removably couple a second of the panel insert members to the second of the generally cylindrical members, whereby each of the panel insert members can be rotated with an associated one of the general cylindrical members relative to each other when installed on movable partitions, said third generally cylindrical member having means coupled to one of the panel insert members to hold the third generally cylindrical member from separating from the basic size when the cooperating tongue and groove members of the first, second and third generally cylindrical members are engaged, and electrical harness means mounted within said panel insert members and traversing across and within the general cylindrical members.

12. The apparatus of claim 11 wherein the third cylindrical member has a pair of generally radially extending ears on opposite sides of the splits, the panel insert member connected to the third cylindrical member having receptacles spaced to receive the ears on the third cylindrical member and to retain the third cylindrical member at its basic size with the tongue and groove means between the cylindrical members engaged.

13. The apparatus of claim 11 wherein each of the generally cylindrical members has a pair of generally radially extending ears, the ears on the third cylindrical member being along the edges of the split, said panel insert members having grooves defining receptacles to receive said ears, said ears and grooves forming the means to couple the panel insert members to the cylindrical members.

14. The apparatus of claim 13 wherein the ears of the first and second cylindrical members are coupled to different panel insert members, the tongue and groove means permitting the panel insert members to pivot relative to each other.

* * * * *